United States Patent [19]

Komurasaki

[11] Patent Number: 5,029,566

[45] Date of Patent: Jul. 9, 1991

[54] KNOCK SUPPRESSION APPARATUS FOR AN INTERNAL COMBUSTION ENGINE

[75] Inventor: Satosi Komurasaki, Himeji, Japan

[73] Assignee: Mitsubishi Denki Kabushiki Kaisha, Tokyo, Japan

[21] Appl. No.: 519,691

[22] Filed: May 7, 1990

[30] Foreign Application Priority Data

May 9, 1989 [JP] Japan ................... 1-114248

[51] Int. Cl.⁵ .............................. F02P 5/14
[52] U.S. Cl. ......................... 123/425; 73/35
[58] Field of Search ............. 123/425, 435; 73/35

[56] References Cited

U.S. PATENT DOCUMENTS 4,512,309 4/1985 Tansuwan ............................ 123/425
4,557,236 12/1985 Showalter .
4,607,602 8/1986 Komurasaki ........................ 123/425

FOREIGN PATENT DOCUMENTS 0115907 8/1984 European Pat. Off. ............ 123/435
3620733 1/1987 Fed. Rep. of Germany ...... 123/425

Primary Examiner—Tony M. Argenbright
Assistant Examiner—Robert E. Mates
Attorney, Agent, or Firm—Sughrue, Mion, Zinn, Macpeak and Seas

[57] ABSTRACT

A knock suppression apparatus for an engine includes a knock sensor for sensing an engine operating parameter representative of an occurrence of knocking and a knock unit for detecting knock signals in the output signal of the knock sensor and controlling the ignition timing of the engine to suppress the knocking. The knock sensor is connected with the knock unit by wiring that is disposed in the proximity of wiring for a component of the vehicle that can induce electrical noise in the knock sensor wiring large enough to be mistaken for a knock signal substantially only when the engine load is low or decreasing. In a preferred embodiment, the knock sensor wiring is in a wiring harness for an antilock brake control system.

9 Claims, 4 Drawing Sheets

KNOCK SUPPRESSION APPARATUS FOR AN INTERNAL COMBUSTION ENGINE

BACKGROUND OF THE INVENTION

This invention relates to a knock suppression apparatus that suppresses knocking of an internal combustion engine of a vehicle. More particularly, it relates to a knock suppression apparatus that is not adversely affected by electrical noise caused by large currents flowing through the electrical system of the vehicle.

A knock suppression apparatus is a device that detects and suppresses knocking of an internal combustion engine to increase engine efficiency. There are a number of methods that can be used to suppress knocking, but the most commonly-used method is to adjust the ignition timing of the engine. A knock suppression apparatus generally includes a knock sensor in the form of an acceleration sensor that generates an electrical output signal in response to engine vibrations. The output signal of the knock sensor is input to an electronic control unit, which processes the output signal to separate components due to knocking from components due to miscellaneous mechanical vibrations of the engine and electrical noise. Based on the processed signal, the electronic control unit retards the ignition timing until knocking is no longer detected.

The knock sensor is connected with the electronic control unit by wiring that is combined with wiring from other components to form a wiring harness. If the wiring for the knock sensor is in a harness carrying large continuous or large inrush currents, such as the headlight harness, electrical noise will be induced in the wiring for the knock sensor. If the level of the induced electrical noise is high enough, the electronic control unit may mistake the electrical noise for a signal due to engine knocking and retard the ignition timing in response to the noise. If the electronic control unit mistakenly senses knocking and retards the ignition timing when the engine speed is low or decreasing, no significant harm takes place, but if it does so when the vehicle is accelerating, the acceleration of the vehicle will be poor, the fuel consumption will increase, and the driver of the vehicle will receive an unpleasant sensation. In short, the engine efficiency will decrease, and the entire purpose of knock suppression will be defeated.

It is conceivable to electrically isolate the wiring for the knock sensor from other wiring by the use of shielded cable, for example, or to dispose the wiring for the knock sensor so that it is sufficiently remote from other wires to prevent electrical noise from being induced. However, the use of shielded cable increases the cost of a knock suppression apparatus, and in automotive vehicle, where space it is at a premium, it is difficult and inconvenient to physically isolate the wiring for the knock sensor from all other wiring.

SUMMARY OF THE INVENTION

It is an object of the present invention to provide a knock suppression apparatus for an internal combustion engine of a vehicle that is not adversely affected by electrical noise caused by an electrical component of the vehicle.

A knock suppression apparatus for an internal combustion engine according to the present invention includes a knock sensor for sensing an engine operating parameter representative of an occurrence of knocking and generating a corresponding output signal, detecting means for detecting knocking based on the output signal of the knock sensor, and control means for controlling the operation of the engine to suppress the knocking. The knock sensor is connected with the detecting means by wiring that is in the proximity of wiring for a component of the vehicle that can induce electrical noise in the knock sensor wiring of sufficient magnitude to be mistaken by the detecting means for a signal due to knocking substantially only when the engine load is low or decreasing.

In one embodiment, the knock sensor comprises an acceleration sensor mounted on an engine of a vehicle for generating an output signal corresponding to engine vibrations.

In another embodiment, the knock sensor comprises a pressure sensor for sensing the pressure in a combustion chamber of an engine cylinder and generating a corresponding output signal.

Because the wiring for the component does not induce electrical noise large enough to be mistaken for a signal due to knocking when the vehicle is accelerating, even if induced the electrical noise causes the detecting means to mistakenly detect knocking and the control means operates to suppress knocking, the engine operation will not be adversely affected.

The vehicle component can be any one that will not induce electrical noise in the wiring for the knock sensor large enough to be mistaken for a signal due to knocking when the engine load is high or increasing, such as when the vehicle is accelerating. It is not necessary that the component never induce electrical noise in the knock sensor wiring except when the engine load is low or decreasing. Rather, electrical noise of a magnitude large enough to be mistaken for a knock signal is preferably induced substantially only when the engine load is low or decreasing. The engine load decreases when the brakes of the vehicle are applied, so a component that operates in conjunction with the brakes is particularly suitable. For example, in a preferred embodiment, the wiring for the knock sensor is in the same wiring harness as wiring for an antilock brake control system.

The control means can be any device that can adjust the engine operation to suppress knocking. In a preferred embodiment, the control means adjusts the engine ignition timing when knocking occurs.

DESCRIPTION OF THE PREFERRED EMBODIMENT

Figure 1:
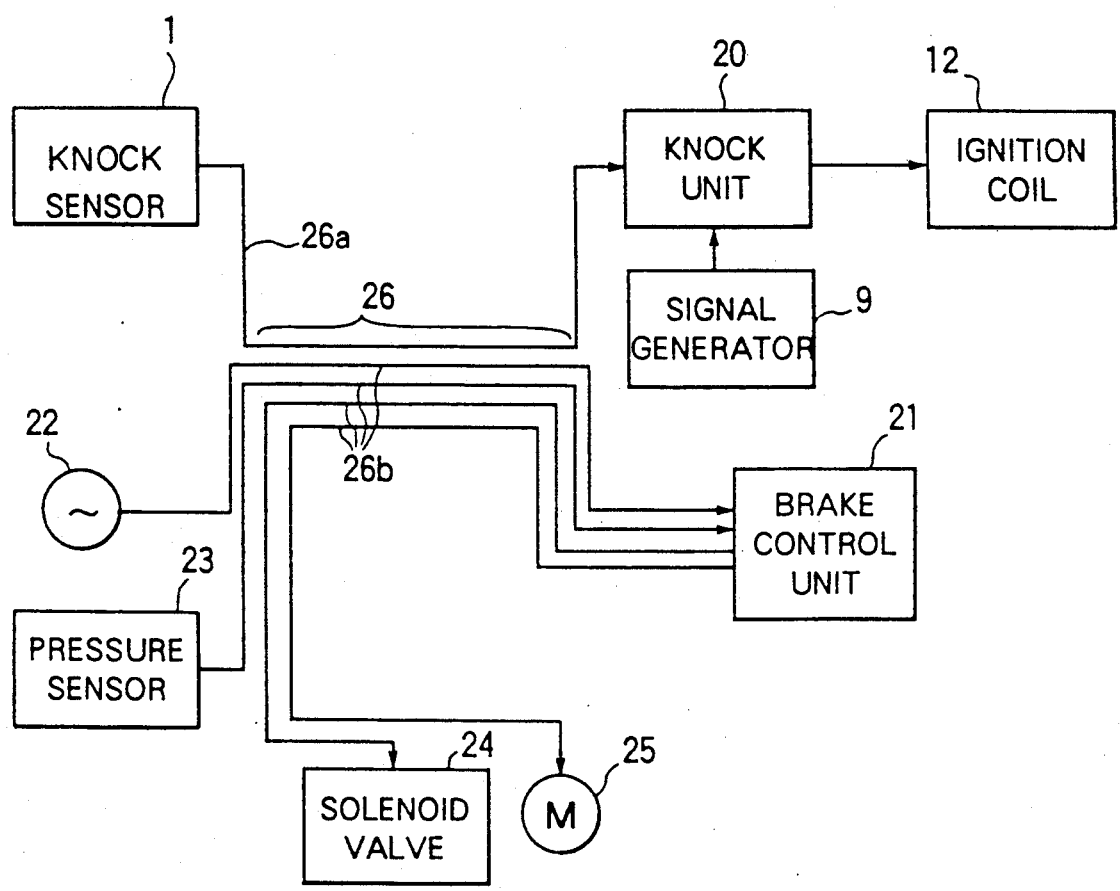
FIG. 1 is a block diagram of an embodiment of a knock suppression apparatus according to the present invention.

FIG. 1 schematically illustrates an embodiment of a knock suppression apparatus according to the present invention as applied to a vehicle with an antilock brake control system. A conventional knock sensor, such as a piezoelectric acceleration sensor 1, is mounted on an unillustrated engine in a location having good resonance with respect to engine vibrations due to knocking. The acceleration sensor 1 generates an electrical output signal indicating the engine vibrations that it senses and provides the output signal to a conventional knocking control circuit, referred to as a knock unit 20, through wiring 26a. This wiring 26a will be referred to as the knock sensor wiring 26a. The knock unit 20 also receives an input signal from a rotational signal generator 9 that generates signals in synchrony with the rotation of the engine. Based on the output of the acceleration sensor 1, the knock unit 20 determines when knocking is taking place and controls the ignition coil 12 for the engine to retard the ignition timing sufficiently to suppress the knocking.

The knock sensor wiring 26a is in the same wiring harness 26 as the wiring 26b for a component that can induce electrical noise in the knock sensor wiring 26a large enough to be mistaken for a signal due to knocking substantially only when the engine load is low or decreasing. In the present embodiment, this component is a conventional antilock brake control system that prevents the unillustrated brakes of the vehicle from locking. The brake control system includes a rotation sensor 22 that senses the rotation of the unillustrated wheels of the vehicle, a pressure sensor 23 that senses hydraulic pressure, a motor 25 that drives an unillustrated pump for generating hydraulic pressure, and a solenoid valve 24 that controls the magnitude of the hydraulic pressure generated by the pump. The rotation sensor 22 and the pressure sensor 23 provide input signals to a brake control unit 21, which on the basis of these signals controls the operation of the motor 25 and the solenoid valve 24 so as to prevent locking of the brakes. Antilock brake control systems are well known to those skilled in the art, so a detailed explanation of the structure and operation of the antilock brake control system employed in the present embodiment will be omitted.

Figure 2:
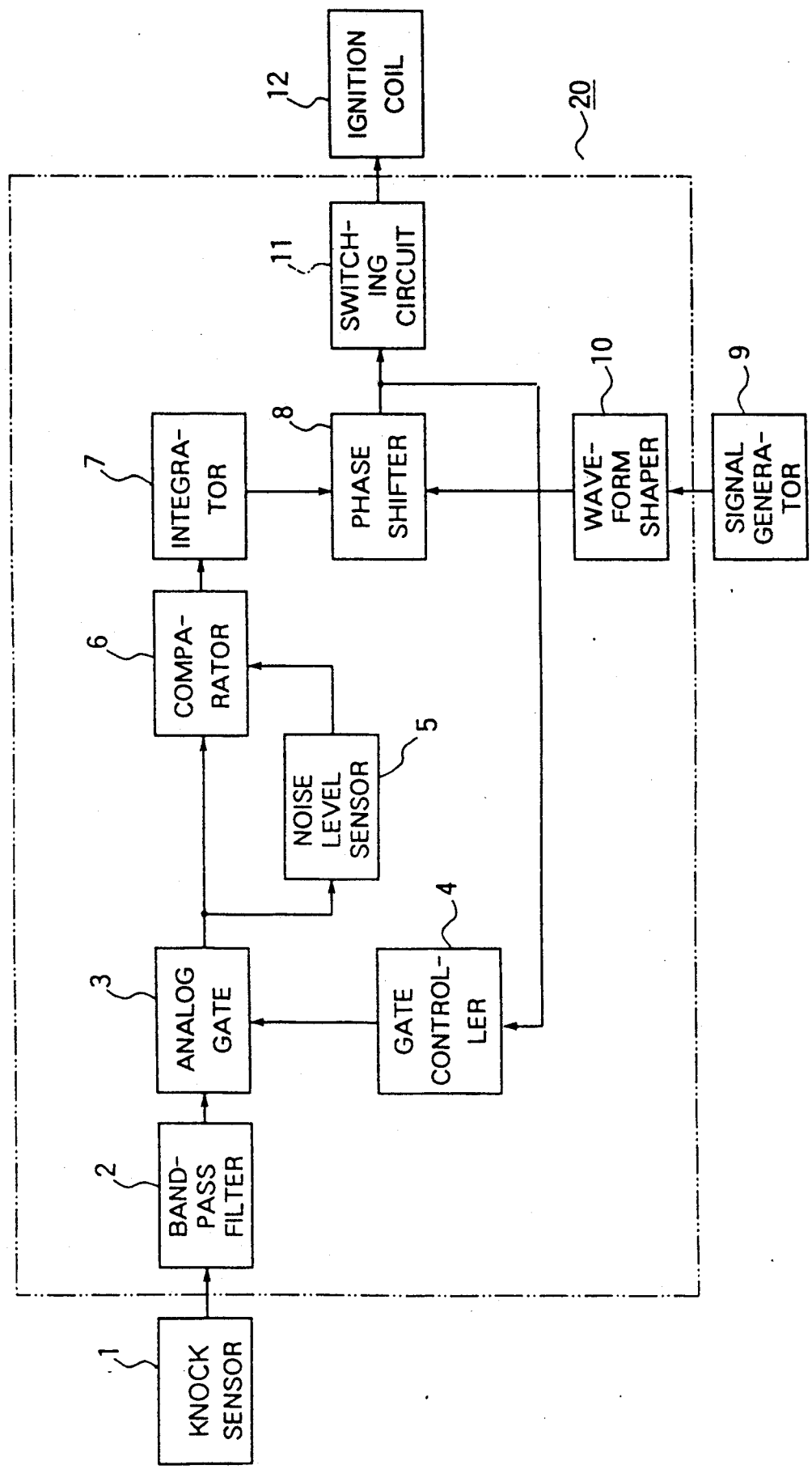
FIG. 2 is a block diagram of an example of the knock unit of FIG. 1.

The knock unit 20 constitutes detecting means for detecting engine knocking based on the output signal of the acceleration sensor 1 and control means responsive to the detecting means for controlling the engine operation to suppress knocking when the detecting means detects knocking. FIG. 2 is a block diagram of an example of the knock unit 20 of FIG. 1. It includes a bandpass filter 2 that receives the output signal from the acceleration sensor 1. The bandpass filter 2 passes only that component of the output signal of the acceleration sensor 1 lying in a frequency band corresponding to engine knocking, and this component is input to an analog gate 3 that can be opened and closed in order to block noise that is an impediment to the detection of knock signals. The opening and closing of the analog gate 3 is controlled by a gate controller 4. The output of the analog gate 3 is provided to a noise level sensor 5 that generates an output signal having a DC voltage that is proportional to the average amplitude of the rectified output of the analog gate 3.

The output of the analog gate 3 and the output of the noise level sensor 5 are input to a comparator 6, which generates output pulses when the input signal from the analog gate 3 is higher than the input signal from the noise level sensor 5. The output pulses from the comparator 6 are integrated by an integrator 7, which generates an output signal having a voltage corresponding to the strength of the knocking of the engine.

The pulses that are generated by the signal generator 9 at a frequency corresponding to the rotational speed of the engine are shaped by a waveform shaper 10, which generates pulses having a rising edge and a falling edge occurring at prescribed rotational positions of the crankshaft of the engine. The output of the waveform shaper 10 is input to a phase shifter 10. The output signal of the integrator 7 is also provided to the phase shifter 8. The phase shifter 8 generates output pulses having a phase that is shifted from that of the output of the waveform shaper 10 by an amount corresponding to the magnitude of the output signal of the integrator 7. The output pulses of the phase shifter 8 operate a switching circuit 11 that controls the supply of current to the ignition coil 12 of the engine.

Figure 3:
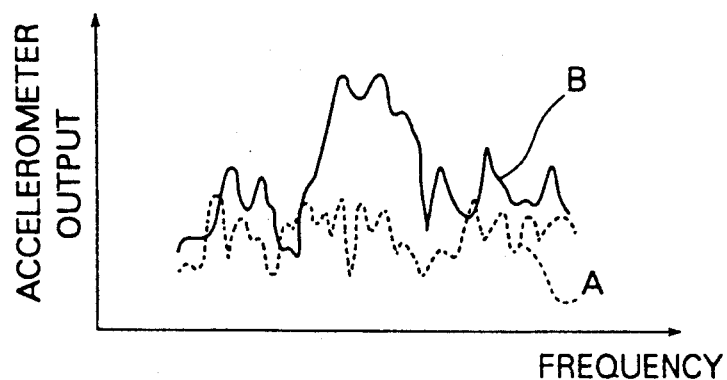
FIG. 3 is a graph of the frequency characteristics of the output signal of the acceleration sensor.

FIG. 3 illustrates the frequency characteristics of the output signal of the acceleration sensor 1. In the figure, curve A shows the characteristics of the output signal when there is no knocking, and curve B shows the characteristics of the output signal when knocking is occurring. In addition to a knock signal (a signal that is generated by knocking), the output signal of the acceleration sensor 1 contains various other noise components such as components due to mechanical noise of the engine, ignition noise, and noise due to the signal transmission pathway.

Comparing curve A and curve B of FIG. 3, it can be seen that the knock signal has unique frequency characteristics.

Accordingly, although the frequency distribution of the knock signal will differ from engine to engine and in accordance with differences in the location in which the acceleration sensor 1 is mounted on the engine, there is always a clear difference in the characteristics of the output of the acceleration sensor 1 when knocking is taking place.

By passing only the frequency component corresponding to the knock signal, noise having other frequency components is suppressed and the knock signal can be efficiently detected.

Figure 4:
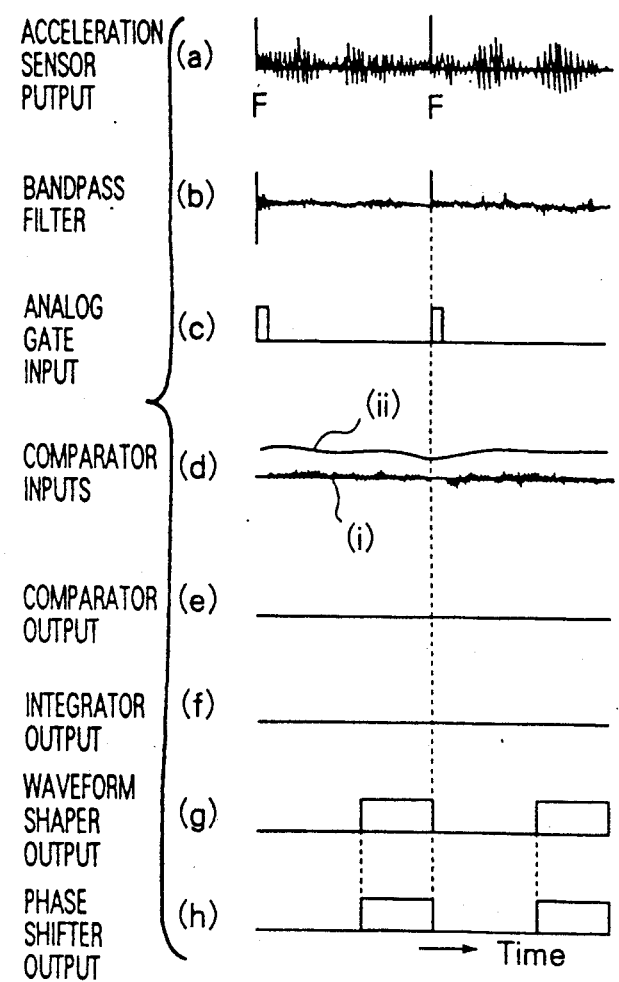
FIGS. 4(a-h) show the output signals of various portions of the knock unit of FIG. 2 when knocking is not taking place.
Figure 5:
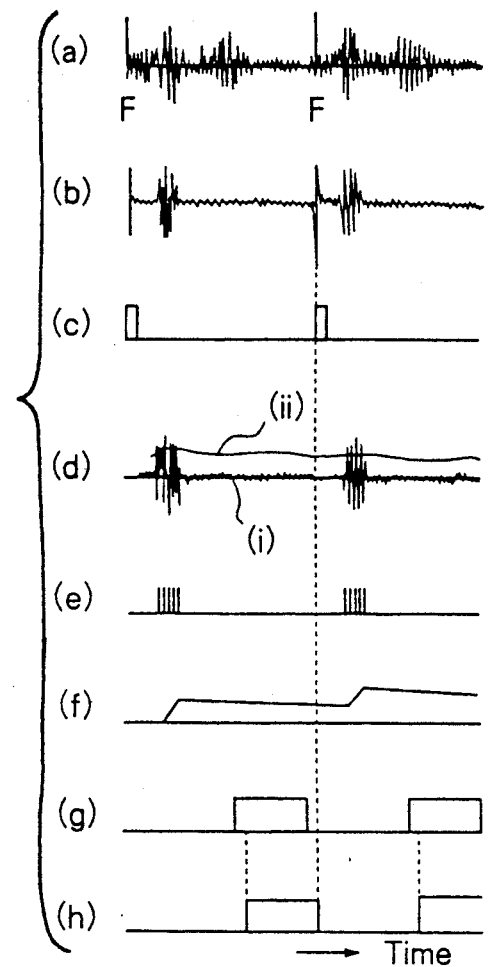
FIGS. 5(a-h) show the output signals of various portions of the knock unit of FIG. 2 when knocking is occurring.

The operation of the embodiment of FIG. 1 will be explained while referring to FIGS. 4 and 5, which illustrate the waveforms of the output signals of various portions of the knock unit 20. FIG. 4 illustrates the case when there is no knocking and FIG. 5 illustrates the case when knocking is taking place in the engine. When the engine is operating, the signal generated by the signal generator 9 in accordance with previously-determined ignition timing characteristics undergoes waveform shaping in the waveform shaping circuit 10 to form pulses, which are input to the phase shifter 8. The pulses drive the switching circuit 11 via the phase shifter 8 and switch the current to the ignition coil 12 on and off. When the current to the ignition coil 12 is cut off, the ignition coil 12 generates a high voltage that is applied to unillustrated spark plugs of the engine.

The engine vibrations that occur during engine operation are detected by the acceleration sensor 1, which generates an output signal as shown by FIG. 4a. When the engine is not knocking, the output signal of the acceleration sensor 1 does not include a component due to knocking, but it includes components due to other mechanical vibrations or due to ignition noise that is superimposed on the signal transmission pathway at the time of firing F of the cylinders of the engine.

The output signal of the acceleration sensor 1 is passed through the bandpass filter 2, and a large part of the mechanical noise component is suppressed, as shown in FIG. 4b. However, as the ignition noise component is strong, it has a high level even after passing through the bandpass filter 2, as shown by the spikes in FIG. 4b.

In order to prevent the ignition noise from being misidentified as knock signals, the analog gate 3 is closed for a prescribed length of time each time one of the cylinders is fired. The analog gate 3 is closed by a pulse (FIG. 4c) that is output by the gate controller 4, which is triggered by the output of the phase shifter 8, and as a result, the ignition noise is removed. Therefore, only low-level mechanical noise remains in the output of the analog gate 3, as shown by curve (i) of FIG. 4d. This output signal is provided to the noise level sensor 5 and the comparator 6.

The noise level sensor 5 responds to changes in the peak level of the output signal of the analog gate 3. It can respond to a relatively gradual change in the peak value of normal mechanical noise, and it generates an output signal having a DC voltage that is slightly higher than the peak of the mechanical noise (curve (ii) in FIG. 4d). This output signal is also provided to the comparator 6.

The comparator 6 generates an output signal when the input signal from the analog gate 3 is higher than the input signal from the noise level sensor 5. As shown in FIG. 4d, when knocking is not taking place, the output of the noise level sensor 5 (curve (ii)) is higher than the average peak value of the output signal of the analog gate 3 (curve (i)), so as shown in FIG. 4e, nothing is output from the comparator 6.

The integrator 7 integrates the output signal from the comparator 6, so when knocking is not taking place, the output signal of the integrator 7 is zero as shown in FIG. 4f.

The phase shifter 8 shifts the phase of the input signal from the waveform shaper 10 (shown by FIG. 4g) in accordance with the voltage of the output signal of the integrator 7. When there is no knocking, the integrator 7 output voltage is zero, so the phase shifter 8 does not produce a phase shift, and the output signal of the phase shifter 8 (FIG. 4h) is in phase with the output signal of the waveform shaper 10. As a result, the engine is operated with a reference ignition timing.

However, when knocking takes place, the output of the acceleration sensor 1 contains a knock signal that occurs a certain length of time after ignition, as shown in FIG. 5a. After the output signal of the acceleration sensor 1 passes through the bandpass filter 2 and the analog gate 3, it consists of mechanical noise on which the knock signal is superimposed, as shown by curve (i) in FIG. 5d.

Of the signals that pass through the analog gate 3, the knock signal has a particularly sudden rise, so the response of the output voltage of the noise level comparator 5 is delayed with respect to the knock signal. As a result, the inputs to the comparator 6 are as shown by curves (i) and (ii) in FIG. 5d, and the comparator 6 generates output pulses, as shown in FIG. 5e.

The integrator 7 integrates the pulses from the comparator 6 and generates a voltage corresponding to the amount of knocking, as shown in FIG. 5f. Then, the phase shifter 8 generates an output signal (FIG. 5h) that is delayed with respect to the output signal of the waveform shaper 10 (FIG. 5h) by a prescribed amount corresponding to the output voltage of the integrator 7. Therefore, the ignition timing is retarded by the prescribed amount, and knocking is suppressed.

Figure 6:
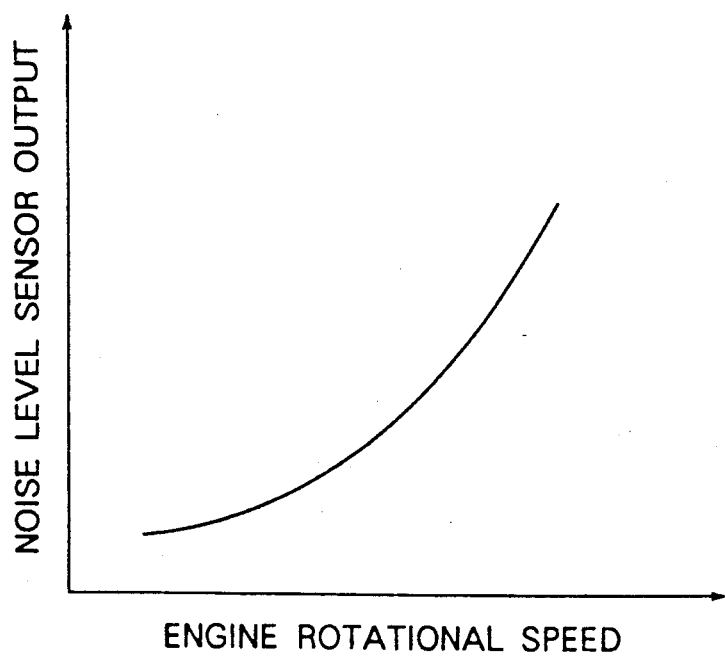
FIG. 6 shows the output of the noise level sensor of FIG. 2 as a function of the engine rotational speed.

As shown in FIG. 6, the output voltage of the noise level sensor 5 increases as the engine rotational speed increases. For example, when the engine rotational speed is 1000 rpm, the output of the noise level sensor 5 is on the order of 100-200 mV. If the knock sensor wiring 26a connecting the acceleration sensor 1 with the knock unit 20 is in the same harness 26 as wiring 26b carrying a large continous or inrush current, noise will be induced in the knock sensor wiring 26a. This noise will be amplified by the bandpass filter 2, and the resulting noise that is input to the comparator 6 will be greater than 100 mV, and sometimes as high as 400 mV, depending on the design of the filter 2. Noise of this level causes the comparator 6 to generate an output signal in the same manner as when knocking occurs, and the knock unit 20 will retard the ignition timing.

In the embodiment of FIG. 1, the knock sensor wiring 26a is in the same harness 26 as the wiring 26b for the antilock brake control system. The solenoid valve 24 and the motor 25 of the brake control system have large drive currents, and these currents can induce a high level of noise in the wiring 26a for the acceleration sensor 1. Furthermore, the pressure sensor 23 operates in a switched mode, so it, too, tends to induce noise in the knock sensor wiring 26a. The resulting noise may be large enough to be mistaken by the knock unit 20 for a knock signal. However, a high level of noise is induced in the knock sensor wiring 26a by the wiring 26b for the antilock brake system only when the brakes are being operated, at which time the engine load is low or decreasing. A high level of noise will virtually never be induced in the knock sensor wiring 26a while the engine load is high or increasing, since at this time the brakes are not applied. Therefore, even if the knock unit 20 mistakenly senses the occurrence of knocking due to electrical noise induced in the knock sensor wiring 26a by the brake control system and retards the ignition timing, the change in ignition timing will occur at a time when it has no significant adverse effect on engine operation. The knock unit 20 will not retard the ignition timing while the vehicle is accelerating, so good engine performance during acceleration and good fuel efficiency can be maintained.

In the illustrated embodiment, the knock sensor wiring 26a is in the same wiring harness 26 as the wiring 26b for the antilock brake control system. However, the knock sensor wiring 26a can be in or near the harness for a different component, such as the harness for the brake lamp wires, as long as the component is one that can induce electrical noise in the knock sensor wiring 26a large enough to be mistaken for a knock signal substantially only when the engine load is low or decreasing. The turn signals of a vehicle are usually operated when the vehicle is travelling slowly or decelerating, so it is also possible for the knock sensor wiring 26a to be in or near the wiring harness for the turn signals.

In addition, although the illustrated embodiment, the knock sensor 1 is in the form of an acceleration sensor, it may be any type of sensor which can sense an engine operating parameter representative of an occurrence of knocking and generate a corresponding output signal. Thus, for example, a pressure sensor can be employed as the knock sensor for sensing the pressure in a combustion chamber of an engine cylinder.

What is claimed is:

1. A knock suppression apparatus for an internal combustion engine of a vehicle comprising:
   a knock sensor for sensing an engine operating parameter representative of an occurence of knocking and generating a corresponding output signal;
   knock sensor wiring;
   knock detecting means for detecting engine knocking based on the output signal of the knock sensor, the knock detecting means being electrically connected to the knock sensor by the knock sensor wiring; and
   engine control means responsive to the knock detecting means for adjusting the engine operation to suppress knocking when the knock detecting means detects engine knocking,
   wherein the knock sensor wiring is disposed in the proximity of wiring for a component of the vehicle that induces electrical noise in the knock sensor wiring of a magnitude large enough to be mistaken by the knock detecting means for a signal due to engine knocking substantially when the engine load is low or decreasing.

2. A knock suppression apparatus as claimed in claim 1, wherein said knock sensor comprises an acceleration sensor mounted on an engine of a vehicle for sensing vibrations of the engine.

3. A knock suppression apparatus as claimed in claim 1, wherein said knock sensor comprises a pressure sensor for sensing the pressure in a combustion chamber of an engine cylinder.

4. A knock suppression apparatus as claimed in claim 1, wherein the engine control means comprises means for adjusting the ignition timing of the engine.

5. A knock suppression apparatus as claimed in claim 1, wherein the knock sensor wiring is disposed in a wiring harness with wiring for a component of the vehicle that can induce electrical noise in the knock sensor wiring of a magnitude large enough to be mistaken by the knock detecting means for a signal due to engine knocking substantially when the vehicle is being braked.

6. A knock suppression apparatus as claimed in claim 5, wherein the vehicle component is an antilock brake control system, and the knock sensor wiring is disposed in a wiring harness with wiring for the antilock brake control system.

7. A knock suppression apparatus as claimed in claim 5, wherein the vehicle component is a brake light for the vehicle, and the knock sensor wiring is disposed in a wiring harness with wiring for the brake light.

8. A knock suppression apparatus for an internal combustion engine of a vehicle comprising:
   a knock sensor for sensing an engine operating parameter representative of an occurrence of knocking and generating a corresponding output signal;
   knock detecting means responsive to the knock sensor for detecting a knock signal due to engine knocking in the output signal of the knock sensor;
   ignition control means responsive to the knock detecting means for adjusting the ignition timing of the engine when the knock detecting means detects a knock signal; and
   knock sensor wiring connecting the knock sensor to the knock detecting means and disposed in a wiring harness together with wiring for a component of the vehicle, the current flowing through the wiring for the component being capable of inducing electrical noise in the knock sensor wiring of a magnitude large enough to be mistaken by the knock detecting means for a knock signal substantially when the vehicle is not accelerating.

9. An automotive vehicle comprising:
   an engine;
   an antilock brake control system comprising a control unit and a hydraulic pressure control valve electrically connected with the control unit by wiring in a wiring harness;
   a knock sensor for sensing an engine operating parameter representative of an occurrence of knocking and generating a corresponding output signal;
   knock detecting means responsive to the knock sensor for detecting a knock signal due to engine knocking in the output signal for the knock sensor;
   ignition control means responsive to the knock detecting means for adjusting the ignition timing of the engine when the knock detecting means detects engine knocking; and
   knock sensor wiring connecting the knock sensor to the knock detecting means and disposed in the wiring harness for the antilock brake control system.

* * * * *